Aug. 16, 1966  C. C. RAYBURN  3,266,121
METHOD OF MAKING A CAPACITOR-RESISTOR CONSTRUCTION
Filed Feb. 14, 1963  3 Sheets-Sheet 1
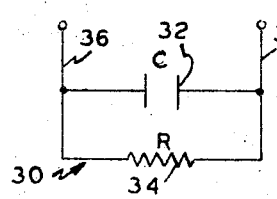
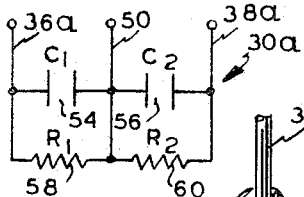
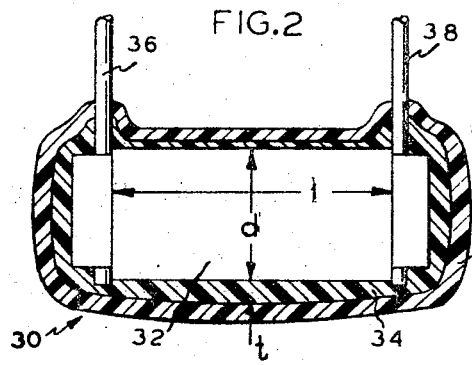
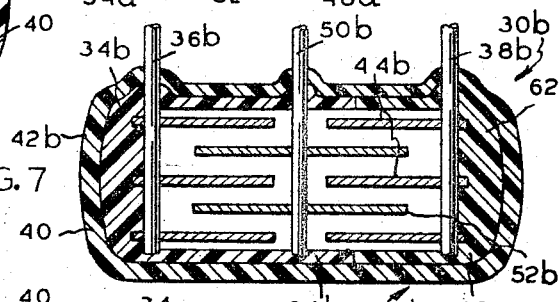
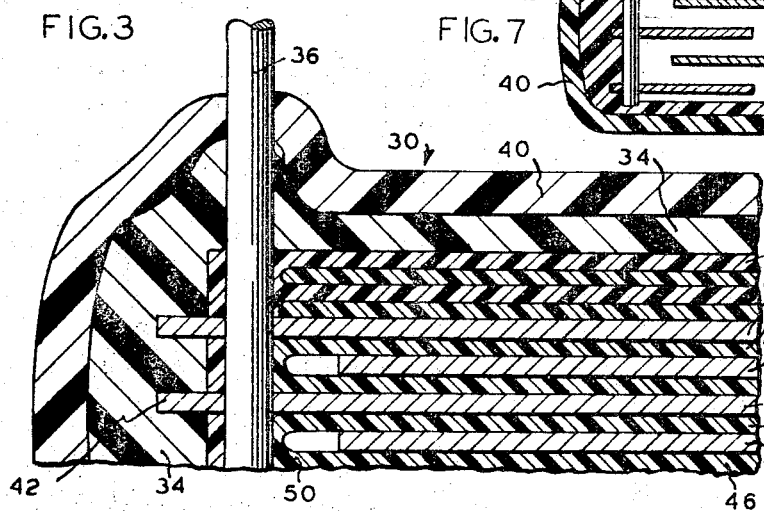
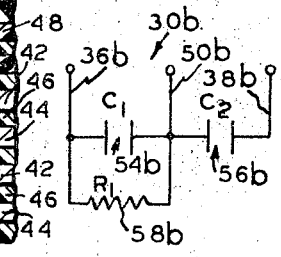
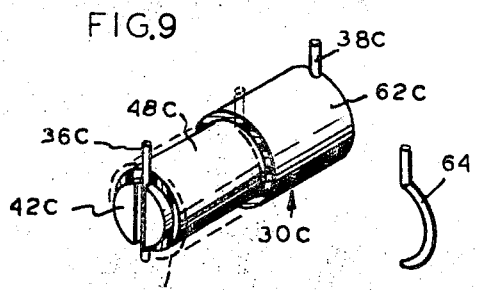
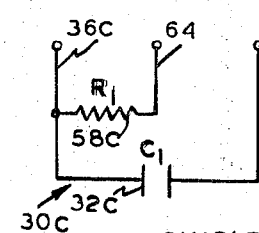
INVENTOR.
CHARLES C. RAYBURN
BY
*Robert A. Silver*
ATTORNEY Aug. 16, 1966          C. C. RAYBURN          3,266,121
METHOD OF MAKING A CAPACITOR-RESISTOR CONSTRUCTION
Filed Feb. 14, 1963          3 Sheets-Sheet 3
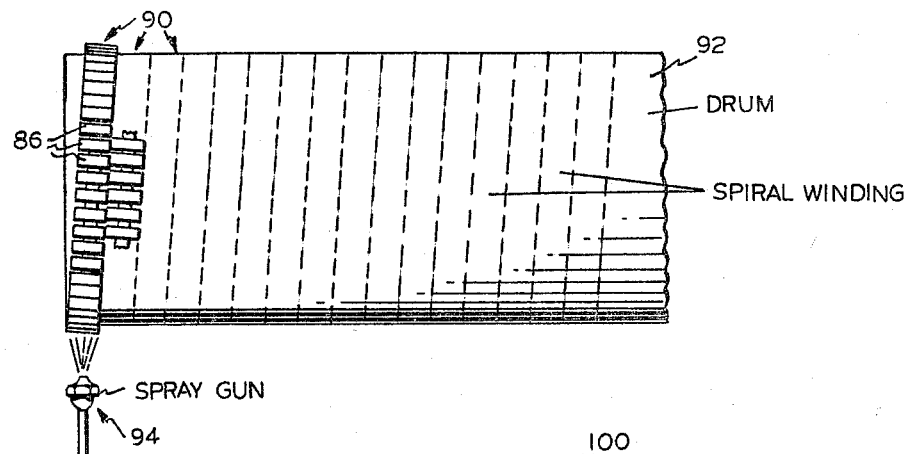
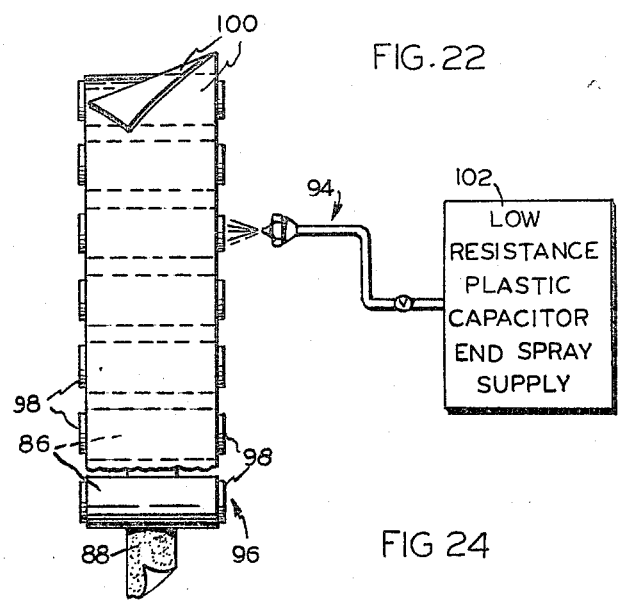
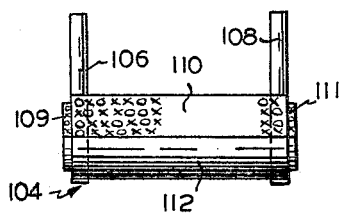
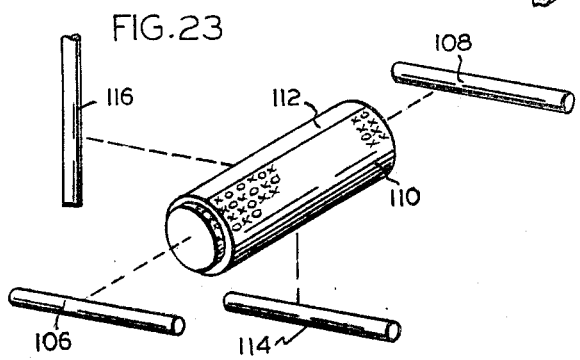
INVENTOR.
CHARLES C. RAYBURN
BY
ATTORNEY

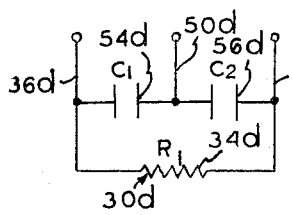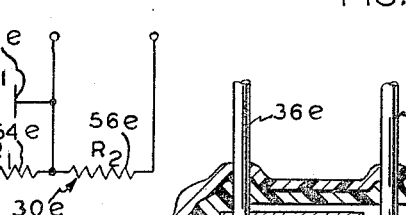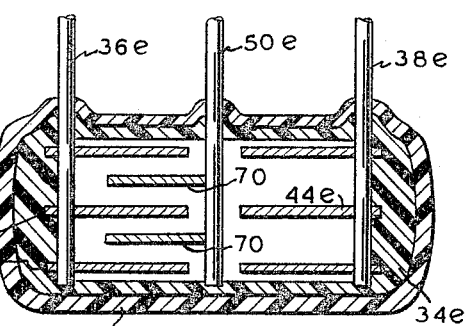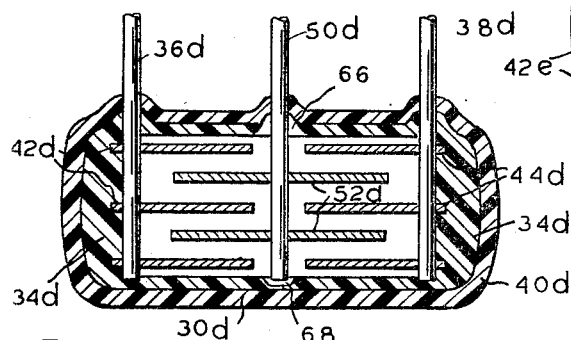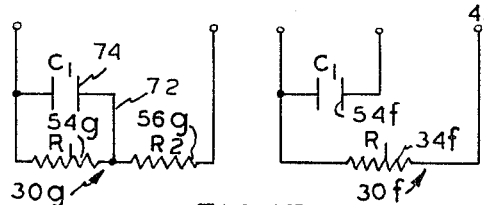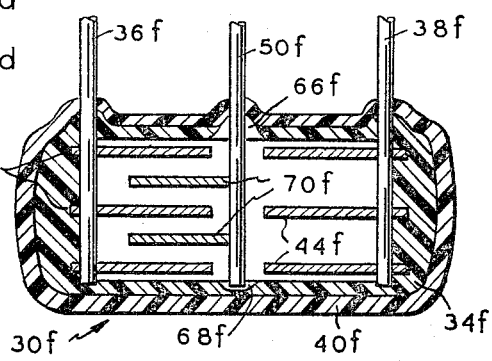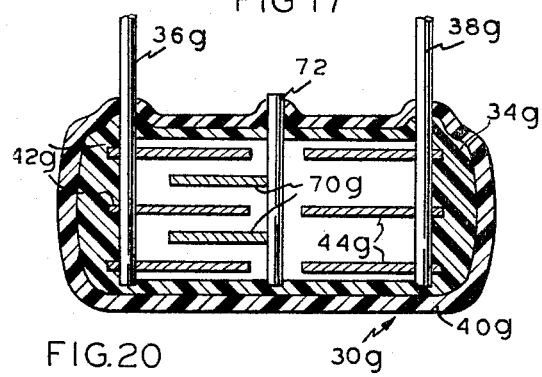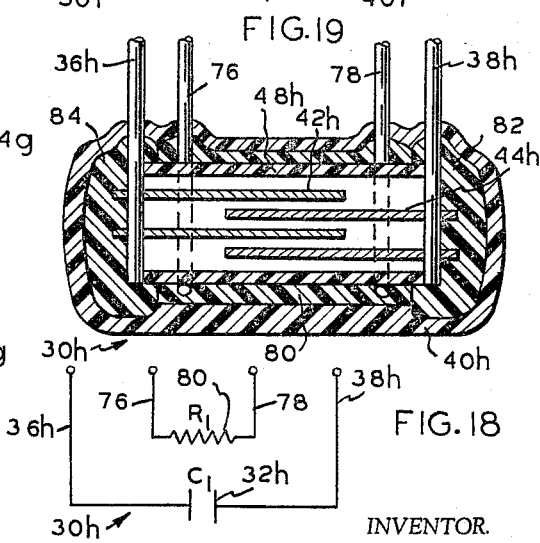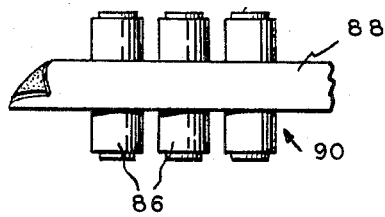
INVENTOR.
CHARLES C. RAYBURN United States Patent Office 3,266,121
Patented August 16, 1966

3,266,121
METHOD OF MAKING A CAPACITOR-RESISTOR CONSTRUCTION
Charles C. Rayburn, Falls Church, Va., assignor to Illinois Tool Works Inc., Chicago, Ill., a corporation of Delaware
Filed Feb. 14, 1963, Ser. No. 258,449
8 Claims. (Cl. 29—25.42)

This invention relates in general to capacitor-resistor constructions and the method of making same and more particularly relates to a capacitor-resistor construction where the capacitor is of the so-called "rolled" form.

There are many electrical and electronic circuits requiring a resistor and a capacitor. These are usually supplied as separate components. For example, television and radio receiver manufacturers usually buy capacitors and resistors as separate components and separately assemble same into the receivers.

In my co-pending application entitled "Wound Capacitor," filed October 25, 1961, having Serial No. 147,646, now Patent No. 3,134,059 I show a family of capacitor constructions utilizing a convolutely wound electrode and dielectric film, and in co-pending application Serial No. 102,753, filed April 13, 1961, now Patent No. 3,117,364 entitled "Apparatus for Manufacture of Capacitors," assigned to the same assignee and of which I am one of the joint inventors, there is shown a method and apparatus for automatically assembling leads to the capacitor constructions in the first mentioned application. The method and articles discussed in the aforementioned patent applications are particularly well adapted for providing the capacitor portion of the instant capacitor-resistor construction, but as will be appreciated, the capacitor-resistor construction about to be discussed is not limited to the concepts set forth in those applications.

It is a general object of this invention to provide a capacitor-resistor construction where the capacitor is of the "rolled" type and wherein the resistor is integral therewith.

More particularly, it is an object of this invention to provide a dual component having capacitance and resistance which may be assembled into the space occupied by the capacitor alone heretofore.

It is a further object of this invention to provide a capacitor-resistor construction which requires a single installation as versus the two installations heretofore required.

It is a further object of this invention to provide a capacitor-resistor construction which can be placed either where the resistor construction was placed into an electronic assembly or where the capacitor assembly formerly fit into an assembly with no retooling or redesigning necessary on the part of the manufacturer making an electronic assembly such as a television set or a radio receiver or similar items.

It is another object of this invention to provide a resistor-capacitor construction which has less installation failure since field soldering of the components is cut in half, the incidence of field failure having a direct and high correlation to the soldering operation.

It is a further object of this invention to provide a capacitor-resistor construction which utilizes less terminal wire than the two components utilized individually to thus make a more economical construction.

A further object of this invention is to provide a convolutely rolled capacitor construction wherein the outer layers of the dielectric material used in the capacitors serve as the support surface for the resistor.

It is a further object of this invention to provide a capacitor construction wherein the relative locations of the two leads as well as the dimensions of the capacitor are accurately controlled so as to provide accurately controlled resistance on the resistor portion of the dual component.

It is a further object of this invention to provide a capacitor-resistor construction which has exceptionally good heat dissipation properties for maintaining constant values of resistance when the component is in use.

It is a further object of this invention to provide a construction wherein the capacitor and resistor components, due to the direct thermal coupling of the capacitor and the resistor, can provide a temperature compensation of impedance to provide constant values of resistance and capacitance over a wide range of ambient temperatures.

It is a further object of this invention to provide a basic constructional approach which will, with minor modifications, provide a wide variety of circuits utilizing a wide range of values of both capacitance and resistance.

A still further object of this invention is to provide a novel method of manufacturing a capacitor-resistor construction which is economical, well suited for mass production techniques, provides high quality results, provides rugged components, and is otherwise well adapted for the purposes for which it was designed.

The novel features that are characteristic of the invention are set forth with particularity in the appended claims. An understanding of the invention, from a structural and a functional standpoint, together with additional objects and advantages thereof will be best understood by reading the following description in conjunction with the accompanying drawings wherein:

FIG. 1 is a semidiagrammatic circuit diagram of the construction shown in FIG. 2;

FIG. 2 is a partial sectional view showing a capacitor-resistor construction;

FIG. 3 is an enlarged fragmentary sectional view of a portion of FIG. 2;

FIG. 4 is a semidiagrammatic circuit diagram of the construction shown in FIG. 5;

FIG. 5 is a diagrammatic sectional view through a three foil and three lead wire capacitor-resistor construction which provides the circuit shown in FIG. 4;

FIG. 6 is a circuit diagram of the construction shown in FIG. 7;

FIG. 7 is a semidiagrammatic sectional view showing a modified form of construction to that shown in FIG. 5;

FIG. 8 is a semidiagrammatic circuit diagram of the construction shown in FIG. 9;

FIG. 9 is a view of an alternate form of construction of a capacitor-resistor for providing the circuit shown in FIG. 8;

FIG. 10 is a semidigrammatic circuit diagram of the construction shown in FIG. 11;

FIG. 11 is a diagrammatic sectional view of an alternate embodiment of capacitor-resistor construction which is modified from the foregoing to provide the circuit of FIG. 10;

FIG. 12 is a circuit diagram of the construction shown in FIG. 13;

FIG. 13 is a semidiagrammatic sectional view of an alternate construction of capacitor-resistor to provide the circuit of FIG. 12;

FIG. 14 is a circuit diagram of the construction shown in FIG. 15;

FIG. 15 is a semidiagrammatic view of a capacitor-resistor construction to provide the circuit shown in FIG. 14;

FIG. 16 is a circuit diagram of an alternate construction illustrating the circuit of the capacitor-resistor shown in FIG. 17;

FIG. 17 is a semidiagrammatic sectional view of a construction to provide the circuit of FIG. 16;

FIG. 18 is a circuit diagram of an alternate construction of capacitor-resistor shown in FIG. 19;

FIG. 19 is a semidiagrammatic view illustrating the construction to provide the circuit of FIG. 18;

FIG. 20 is a semidiagrammatic view of a method of mounting capacitor blanks on a piece of adhesive tape preliminary to the spraying of the other side thereof as shown in FIG. 21;

FIG. 21 is a view, diagrammatic in nature, showing the mounting of the capacitor blanks on a drum for disposition of the resistor composition upon the capacitor blanks with a special spray gun;

FIG. 22 is a semidiagrammatic portrayal of an alternate method of spraying low resistance capacitor end spray material upon the ends of the capacitor to insure good conductive connection between the ends of the capacitor and the resistor material to be later applied;

FIG. 23 is a semidiagrammatic showing of the assembly of the lead wires to a capacitor blank after it has been treated as shown in FIG. 21; and FIG. 24 is a view of a completed capacitor and resistor construction of the type manufactured by the technique shown in FIGS. 20 through 23.

Returning now to FIGS. 1 and 2 of the drawings, the capacitor-resistor 30 is an integral single unitary component having a capacitor portion 32 and a resistor portion 34 with common terminal wires 36 and 38.

Wound capacitors 32 are normally fabricated from strips or tapes of conductive material such as a metal or a conductively coated dielectric, wound into a tight coil. In winding the capacitor coil or body, two or more conductive tapes 42 and 44 are wound together with dielectric material 46 positioned between the conductive tapes to insulate them from each other. In forming most of the conventional capacitor coils, the conductive tapes or foils 42 and 44 are staggered so that the edge of one tape extends beyond one edge of the dielectric layer, while the opposite edge of the second tape extends beyond the second margin of the insulating layer. Thus, normally in winding the capacitor coil, two conductive tapes are wound in staggered arrangement with the intermediate dielectric material positioned only between the overlapping portions of the two conductive tapes. The wound capacitor coil thus has the exposed extending edges of a pair of conductive tapes forming the two ends of the coil. It is then common practice to secure a lead wire to each end of the coil form by the conductive tapes by soldering. In the co-pending applications aforementioned, I have discussed and taught a new construction for capacitors wherein the lead wires are embedded in the plastic dielectric 46 and extend transversely to the axis of the coil of the capacitor blank. This greatly increases the pull-out strength of the terminal wires 36 and 38 relative to mechanical separation of the terminal wires from the coil and gives exceptionally good electrical properties plus other advantages discussed in the aforementioned applications. As will be appreciated, while the present invention shall be discussed in terms of a capacitor construction utilizing transverse leads, and has special advantages that accrue thereto, I do not intend to be limited to the precise capacitor construction and method of embedding the lead wires 36 and 38 as the instant concepts have a broader application. While the capacitor constructions shown in the various embodiments of the instant invention are only of the so-called standard winding construction and the three foil inductive constructions, other and various methods of winding capacitors are in fact contemplated. The capacitor coil constructions may be of a so-called conventional extended tin foil type of construction, an extended film construction wherein the plastic dielectric extends beyond the edge margins of the two foils 42 and 44, the metallized dielectric film type of capacitor constructions, and the sheared end constructions where the plastic dielectric and the electrode foils extend the same dimension. Also, various other dielectrics including but not limited to materials such as paper or the like may be used.

In winding the capacitor 32 shown in FIGS. 2 and 3, one exemplary form of construction utilizes thin foil for the electrode foils 42 and 44 which are staggered and uses a plastic, such as sold under the trade name "Mylar," thin film 46 as the dielectric which spaces the foils 42 and 44 one from the other. As shown in FIG. 3, it is preferable to wind a number of over-wraps 48 around the capacitor coil for purposes hereinafter appearing. These over-wraps 48 are merely extensions of the film 46 and provide mechanical protection to the capacitor coil during handling thereof and further provides a base for the resistor material 34 which is disposed directly thereon as shall be discussed.

The leads 36 are assembled to the capacitor coil by heating the lead wires such as 36 and 38, preferably by passing a heavy short duration current through a segment of the wire while forcing same inwardly of the end of the capacitor coil to melt and then fuse the plastic dielectric 46 around the lead wire to firmly bond the same into electrical connection with the foils adjacent the respective ends as shown at 50 in FIG. 3. Due to low melting point of the tin foil 42, the coil of foil makes a good electrical connection to the terminal wire 36 and the plastic when cooled provides very good mechanical strength to the construction. It will be noted that the lead wire 36 extends interiorly of the end of the capacitor coil only a distance sufficient to make a good electrical connection to the foil 42, but does not contact the other foil 44 as shown in FIG. 3. Of course, the obverse obtains relative to the lead wire 38 on the other end of the capacitor.

After the lead wires 36 and 38 have been assembled to the capacitor body, the leads may be crimped into desired configurations as shown in my Patents 3,056,939 and 3,162,721. The crimping of the leads forms no basic part of the instant invention other than the lead crimping is compatible with the process and the article involved and thus, the attendant advantages spelled out in the aforediscussed applications will apply to the instant construction.

Since, the lead wires 36 and 38 extend transversely to the axis of the capacitor coil, it is peculiarly easy to mount the capacitors to a support member by taping the lead wires to a bar for dipping purposes. The exact manner of attaching the lead wires to a support member for dipping may be varied to suit, but one manner of so attaching is shown in my co-pending application Serial No. 102,753, aforementioned. The exact method of attaching for dipping purposes is no part of this invention, but as is shown in that application, the construction of the capacitors are peculiarly well adapted for automatic mounting of the capacitors on a support member without human handling.

The resistive material 34, to be disposed on the capacitor blank, may be organic or inorganic and may be applied by dipping, spraying adhesive taping, evaporating, sputtering or by any process compatible with the capacitive base and resistive material being deposited. Of the many ways of applying the resistive material to the capacitor, the dipping process and spraying process are preferred and for these purposes the resistive material 34 may be a carbon resin formulation. One resistive formulation that has been found efficacious for this purpose comprises the following ingredients in the following proportions:

(a) 1050 grams of solvent based epoxy-melamine epoxide equivalent of about 500,
(b) 49.18 grams of coarse channel black,
(c) 21.07 grams of fine channel black,
(d) 216.8 grams of yellow stone talc,
(e) 157.5 grams epoxy resin, epoxide equivalent of about 200,
(f) 52.5 grams of polyamine.

This formulation is cured after application thereof at a temperature of 150° C. for approximately 24 hours. The capacitor-resistor construction shown in FIG. 2 is of the dipped variety with the resistor formation 34 extending completely around the entire capacitor body. As shown in FIG. 2, the particular construction of the capacitor-resistor affords a very good dimensional uniformity. The resistance R of the unit shown in FIG. 2 is found by the formula $$R = \frac{pl}{\pi dt}$$

if $d$ is the diameter of the cylindrical section. By controlling the number of outer "Mylar" over-wraps 48, the diameter $d$ of the cylindrical section can be controlled to within very close tolerances and in commercial practice the dimensional variation of $d$ can be controlled within 1%. The resistivity $p$ of the resistor material 34 and the thickness $t$ of the formulation 34 across the effective length $l$ of the resistor are a function of the formulation of the resistance material and the dipping conditions, each of which may be independently controlled. The length $l$ can be accurately controlled by the automatic machinery set forth in my co-pending application Serial No. 102,753 aforementioned, since the effective length $l$ is dependent on the distance between the two leads 36 and 38.

Of particular note relative to the construction 30, is the power dissipation characteristics of the resistor-capacitor. Resistor life stability is a direct function of the resistor layer temperature. In the particular embodiment shown, heat can conduct through the ends of the resistor layer 34 to the lead wires 36 and 38 which are efficiently coupled thermally to the extended foil ends 42 and 44 of the capacitor foils. The large foil end contact at each end of the capacitor with the resistive layer 34 allows the heat to be coupled uniformly into the capacitor interior to prevent temperature gradients and the attendant non-uniform expansion of the capacitor and resistor sections. Also, the heat of the capacitor-resistor unit conducts directly through the protective outer-coating 40 and finds an exceptionally large convective and radiating surface as compared to conventional resistors.

Another feature of the particular construction concerns the temperature compensating characteristics of the unit 30. The impedance Z of a circuit of resistance R and capacitance C operating at a frequency $$F = \frac{\omega}{2\pi}$$

is the formula $$Z = \frac{R(1 - jwCR)}{1 + \omega^2 C^2 R^2}$$

Since the temperature coefficient of capacitance of a Mylar capacitor is positive and linear to about 85° C. and a resistive formulation 34 can be varied and selected to be linear and of required positive temperature coefficient of resistance, it follows that a degree of temperature compensation of impedance is achieved. Although this may be accomplished with separate resistor and capacitor components in theory, the thermal coupling problem is very difficult in practice so as to be sure that each component is at precisely the same temperature at the same time. Since the capacitor-resistor is an integral unit 30 in the instant construction and because of the thermal coupling aforementioned, the temperature compensation of impedance is completely compatible with the disclosed construction.

A brief recapitulation of one preferred manufacturing sequence is:

(a) Wind a capacitor coil;
(b) Assemble leads to the coil;
(c) Crimp leads is required;
(d) Load capacitor on a support member for dipping;
(e) Dip capacitors in resistive formulation;
(f) Cure resistive formulation;
(g) Dip units in coating material;
(h) Stamp identifying numbers, etc. on the part;
(i) Remove part from support member and cure the coating;
(j) wax is required and perform electrical test.

Other resistor-capacitor circuits are available with the same general type of integral construction with slight modifications. The embodiments shown in FIGS. 4 and 5 have many similar features to those aforediscussed and similar portions will be identified with similar reference numerals with the addition of the suffix "a." The construction shown in FIG. 5 is highly diagrammatic in form. More particularly, the unit 30a is a three foil capacitor construction with a third terminal wire 50 having the capacitor portion of the construction similar to that shown in FIG. 7 of my co-pending application entitled "Wound Capacitor" having Serial No. 147,646, now Patent No. 3,134,059 aforementioned. The central lead wire 50 is heated and forced inwardly to engage the center foil 52 which cooperates in a capacitive sense with each of the outboard foils 44a and 42a which are respectively connected to the terminal wires 38a and 36a. As shown in Patent No. 2,949,570, the center foil 52 may be shorter than the outboard foils so as to provide very low capacitive values or it may have the same number of effective turns as the respective outboard foils. In FIG. 5, the dielectric material 46a between the respective electrode foils 44a, 42a and 52 is indicated by a blank space and the over-wrap layers of dielectric 48a is also indicated by a blank space. As will be apparent, from viewing FIG. 5, the circuit of FIG. 4 is provided having two capacitances, C1 and C2 identified by the reference numerals 54 and 56, and two resistances R1 and R2 identified by the reference numerals 58 and 60. The variance in the manufacturing sequence occurs by the winding of a different capacitor coil in step "a" above and in the assembly of the additional lead in the center which is a modification of step b. The manufacturing sequence c. through f. will be substantially the same. It will be apparent that C1 and C2 and R1 and R2 in this embodiment 30a may be equal or may be a ratio depending upon the location of the center lead 50 and the effective areas of over-lap of the foils 52–42a and 52–44a as determined by the dimensions of the various foils and the original winding process. Essentially the same advantages accrue to the construction shown in FIG. 5 as discussed relative to the FIGS. 1 through 3.

Still another embodiment of the invention is shown in FIGS. 6 and 7 and similar parts will be identified with similar reference numerals with the addition of the suffix "b." This embodiment 30b is produced by varying the step "e" relating to dipping the capacitors in the resistive formulation 34, by dipping one end (the right hand end as shown in FIG. 7) in an insulating resin 62 so that the resistive formulation can not contact the right hand lead 38b. The circuit shown in FIG. 6 is thus produced because the formulation 34b on the unit 30b is then dipped so that it extends only between leads 36b and 50b to produce a resistance 58b while the capacitive portions of the structure 54b and 56b are obtained as explained relative to FIG. 5.

The construction 30c shown in FIGS. 8 and 9 has many similarities to the foregoing and similar parts will be identified with similar reference numerals with the addition of the suffix "c." The capacitor-resistor 30c utilizes a capacitor coil body wound similarly to that discussed relative to FIGS. 1 through 3, i.e., a two foil construction. The leads 38c and 36c are assembled in the standard manner aforediscussed. To provide the construction in FIG. 9, it is preferable in the winding operation to provide a larger than normal over-wrap 48c so as to allow the assembly of a preformed terminal wire 64 to the outer-wraps 48c by heating the terminal and pressing it into the outer-wraps for retention thereof without contacting any of the interior foils 42c and 44c. The over-wraps 48c thus serve as a base for supporting the terminal wire 64 as well as to support the resistive formulation 34c and insulating resin 62c. The resistive material 34c is applied subsequential to dipping the right hand end of the body, as shown in FIG. 9, in the insulating resinous material 62c. When the resistive material 34c is applied to the left hand end of the capacitor indicated by the dotted lines 34c, the circuit shown in FIG. 8 is provided. As will be apparent from the circuit, the resistor and the capacitor portions 58c and 32c respectively, have a common lead 36c and then have independent connections to other circuitry with the leads 64 and 38c. The location of the lead 64 may be varied to suit so as to vary the effective length of the resistive formulation 34c.

The capacitor-resistor construction 30d shown in FIGS. 10 and 11 has many similarities to the foregoing and similar parts will be identified with similar reference numerals with the addition of the suffix "d." When the construction shown in FIGS. 4 and 5 is modified by the addition of insulating resins 66 and 68 disposed around the center lead 50d so as to isolate the resistive formulation 34d from contacting the lead, the circuitry of FIG. 10 is provided. Thus, the resistor 34d extends between terminals 36d and 38d whereas two capacitances C1 and C2 with reference numbers 54d and 56d have a common lead 50d as well as the individual outboard leads 36d and 38 respectively.

The construction shown in FIGS. 13 and 14 has many similarities to the foregoing and similar parts will be identified with reference numerals with the addition of the suffix "e." The embodiment 30e shown in FIG. 13, differs from that shown in FIG. 5 in that the center foil 70 of a three electrode foil capacitor has an effective capacitive area with only foil 42e and the right hand foil 44e serves as a lead anchoring means for the terminal 38e and spacing member in the winding operation to maintain dimensional stability. The foil 44e also serves to effectively connect the resistive material 34e to the terminal 38e and to give the thermal coupling to the interior as is required for efficacious results. The center lead wire 50e contacts the offset center foil 70 and thus the capacitive relationship C1 with reference number 54e is established between terminals 36e and 50e whereas two discrete resistor portions 54e and 56e are formed.

The embodiment 30f shown in FIGS. 14 and 15 is substantially similar to the foregoing and similar parts will be identified by similar reference numerals with the addition of the suffix "f." The construction shown in FIG. 15 gives the circuits shown in FIG. 14 and has an initial construction substantially similar to that shown in FIG. 13 except that the center lead 50f is isolated from a resistive material by suitable insulating resin at 66f and 68f similarly to the isolation of the center lead shown in FIG. 11. Thus, the capacitive relationship 54f is established between the leads 36f and 50f and the resistor 34f is between leads 36f and 38f.

The embodiment 30g shown in FIGS. 16 and 17 is substantially similar to the foregoing and similar parts will be identified with similar reference numerals with the addition of the suffix "g." The embodiment 30g is similar to the embodiment shown in FIG. 13 except that the center lead 72 is snipped off close to the body of the unit 30g to give the circuit shown in FIG. 16. Only leads 36g and 38g serve as exterior connections for connection to other circuitry.

The embodiment shown in FIGS. 18 and 19 has many features similar to those aforediscussed and similar parts will be identified with similar reference numerals with the addition of the suffix "h." The embodiment 30h has a coil capacitor base similar to that shown in FIGS. 2 and 3 except that the over-wrap portions of the dielectric films 48h is made extra heavy. The leads 36h and 38h are applied to the ends of the capacitor foil as aforediscussed and the leads 76 and 78 are formed similarly to the lead 64 shown in FIG. 9 and are attached to the over-wrap layer 48h as is the lead 64. However, in this construction, the leads 76 and 78 are spaced close to but not in electrical connection with leads 36h and 38h as shown in FIG. 19. After assembly of the leads 36h, 38h, 76 and 78 to the capacitor coil blank, each end of the capacitor is dipped in an insulating resin 82 and 84 of a depth just sufficient to electrically isolate the leads 36h and 38h from the resistive material 80 which is applied into the intermediate portion of the capacitor body for electrical contact with the leads 76 and 78. The electrical circuitry shown in FIG. 18 is thus provided by the construction shown in FIG. 19.

While two and three foil capacitor constructions have been discussed, and four leads is the maximum number shown in the various embodiments, it will be apparent that $n$ number of foils may be used and $n$ number of leads may be used. With the techniques of lead attachment and isolation disclosed in the foregoing embodiments, it becomes obvious that an infinite number of resistor-capacitor circuits are obtainable with this system.

While the foregoing embodiments have been discussed basically with a dipping system in mind, when high production of a single capacitor-resistor construction is contemplated, certain economies can be obtained by depositing the resistive formulation on the capacitor foil bases by a spraying technique about to be discussed. Of particular importance in a spraying process, is the precise control of the amount of resistive material sprayed on the capacitors. The steps in the spraying operation vary slightly from the dipping operation as shall now be explained. More particularly, after the capacitor blanks or coils are wound, be they two or three foil capacitors, the individual blank 86 may be oriented in slightly spaced relation and affixed to an adhesive tape 88 as shown in FIG. 20 to form a chain subassembly 90. For purposes of discussion, it will be assumed that the capacitor blanks 86 shown in FIG. 20 and the tape 88 are approximately full size. It will be noted that the axis of the capacitor blanks 86 is perpendicular to the axis of the tape 88 and a belt of this tape 90, i.e., a discrete length dependent upon the size of the spraying drum may be loaded with a large number of capacitors in somewhat machine gun bullet fashion. Thus, for the spraying operation the temporary subassembly 90 of the capacitors loaded on tape is formed. The back (non-adhesive) side of the tape 88 is disposed on a drum 92 in a spiral fashion as indicated in FIG. 21 with the tape 88 being disposed adjacent to the drum so that the exposed radially outward portion of the belt 90 discloses only the non-screened portion of the capacitor blanks 86.

The drum 92 and the spray gun 94 are preferably of the type shown in U.S. Patent No. 2,977,928 of which I am a joint inventor and assigned to the same assignee. The spray gun 94 is supplied with a resistive formulation from a suitable supply 95 and the gun uniformly deposits the resistive material over an area encompassing slightly more than 180° of the circumference of the coil. Since the capacitor coils 86 do not have the leads assembled thereto, it is possible on a tape, of some 280 feet in length, to get in the neighborhood of 10,000 to 15,000 capacitors loaded on the drum for a spraying operation. The absence of the leads also requires less space for the high temperature curing of the resistive material and also forms a preassembly which allows pre-testing of the resistive material after it has been sprayed for uniformity and desired characteristics. It will be appreciated that since the subassembly 90, after the spraying operation, has the resistive material disposed on the one face, and all of the parts are in spaced relation, it is relatively easy to pass the assembly as it comes from the drum, through testing apparatus which tests the sprayed bodies for desired resistance characteristics prior to the lead assembly. Thus, defective units are eliminated prior to further operation thereon such as lead assemblies and coating. Also, due to the uniformities involved, this testing may be done completely mechanically and automatically since all of the devices are pre-oriented.

After the individual units 86 have been removed from the tape, the resistor portion 110 is on the over-wraps and there is a masked portion 112 which has no spray material thereon. The sprayed-on resistive resin 110 extends over and on to the extended foils at 109 and 111 as shown in FIGS. 23 and 24. The leads 106, 108 may be assembled by the techniques aforediscussed to provide the completed unit 104 shown in FIG. 24 having a circuitry as shown in FIG. 1. By assembling additional leads, as indicated diagrammatically in FIG. 23, the various other configurations and circuitry may be obtained for generally similar structural relationships as shown in the various embodiments. For example, lead 116 may be inserted into the masked side 112 of the unit 104 to provide the isolation characteristics to in turn provide a circuit such as shown in FIG. 10.

As aforementioned, it is possible to attach the leads to the capacitor blanks 86 prior to placing them on the drum for spraying but this involves a substantial derating of the capacity of the spraying drum in terms of number of capacitors that can be placed on the drum for spraying thereof. The applying of the leads to the unit after spraying poses some problems. Care must be taken when the leads are assembled to the ends of the units which have been presprayed so that the Mylar coil edge does not create such a disturbance that there is a cracking or breaking of the carbon resin film resistance material in this area so as to break conductive paths and increase the resistance of the unit. There are a number of ways to alleviate this problem, for example:

(a) The leads may be soldered to the extended foil without penetrating it to the depth of the Mylar edge.

(b) The leads such as 106 and 108 may be applied by the techniques aforediscussed by offsetting them slightly from the center of the coil so that the lead wires 106 and 108 do not contact that part of the Mylar which is covered by the resin. Since the resistive material contacts the exposed edges of the foils at 109 and 111, there is a good conductive path for the resistance material. This poses problems in orientation of the individual blanks since they must be rotated from their orientation on the adhesive tape 88.

(c) A third way to prevent any resistance change when the leads are assembled, is to spray a very low resistance formulation on the ends by masking the center with a tape 100 shown in FIG. 22, the tape 100 is non-adhesive in character and is applied to the drum after the subassembly 90 is applied to the drum. The width of the tape 100 effectively delineates the effective length of the resistive material 95 which is later applied. The tape 100 is non-adhesive so that it may be stripped off without pulling the coil blanks 86 off of the tape 88. The advantage of the low resistance spray material, which preferably is a formulation which has a resistivity in the order of one to ten percent of the desired resistance formulation 95, is that if the low resistance formulation is disturbed or cracked when the leads are driven in against the Mylar coil, it has virtually no effect on the lead to lead resistance value. The desired resistance formulation 95, although sprayed over the entire length of the capacitor at 110, is paralleled by the low resistance deposits on each end. The resistance value is then determined by the desired resistance formulation which is deposited between the areas of low resistance.

It should be noted, that the end spray process, shown in FIG. 22 is not necessary in all cases. By actual tests, it has been noted that the lead assembly disturbance on the resistive material has a positive change in the neighborhood of three percent positive increase in value in resistance. However, when certain very tight specifications are needed, it may be desirable to go to the end spray approach or the other alternate approaches.

The low resistance material 102 that is sprayed on the end of the capacitor may consist of a thermal setting resin in solid form (epoxy) in a solvent vehicle (butyl-Cellosolve) a liquid resin (epoxy), an inert filler such as talc or cabosil, a curing agent and various carbon types depending on the desired resistivity. Large carbon structure in the form of graphite is used for low values whereas channel blacks in finely divided amorphous form are used for high value. Both forms are available in the trade. A plasticiser in the low resistance formulation prevents the resistance film from cracking, especially at the junction between the extended foil and the Mylar. The plasticiser is not used in the desired resistance formulation, i.e., the material in the supply 95 which provides the resistance value for the unit, since it contributes to aging or value drift over a long period of high temperature under power. This change is not significant when measuring the lead to lead resistance if it takes place only in the low resistance areas.

The resistive material 95 utilized in the spray gun for the desired resistance formulation preferably involves the use of at least some liquid resin rather than only solid resins in solvent. The liquid resin is added to react with the curing agent which is added after the formulation has been milled for a period of time. The curing agent is added to the formulation jar and mixed in only a few minutes before removing the jar from the jar mill and emptying its contents into the spray gun 94. The curing agent is added in order that the resistive formulation may actually cure on the spray drum. Heat may be added at this point by convection and radiation to bring the units to a temperature of about 80° C. Care must be taken that higher temperatures are not involved so as to soften the adhesive backing material causing the capacitors to fall off of the spray drum. To obtain greater stability of value, it is desirable to remove the capacitors from the tape and on large trays subject them to a temperature of about 150° C. for several hours. The length of time is somewhat dependent upon the thicknesses and values involved but ranges from 2 to 24 hours. With the curing agent, the resin will sufficiently polymerize so that it will not suffer a viscosity decrease when it is subjected to 150° C. With the curing agent, the units would stick together because the seemingly dry formulation would suddenly become liquid when subjected to the curing temperature.

On the other hand, when the leads are to be isolated from the resistance circuit, it is possible to use a fast curing epoxy resin in the spray system utilizing a masking tape 100 for restricting its application. The tapes may be of such material such as polystyrene which, due to the thermoplastic characteristics, can in certain situations be left on the unit since the leads may be assembled thereto.

The resistive formulations used with the tape system ranges from about 20 ohms to 5 megohms per square. If the plan area offered by the capacitor were ½ inch long by ¼ inch diameter or width, the resistance range would be 40 ohms to 10 megohms since there are effectively 2 squares in series. If the ratio of diameter to length is reduced, the resistance range increases, whereas the resistance range is decreased if the diameter to length range is increased. The capacitor manufacturing art is quite flexible since both diameters and length of capacitors are changed to effect economies in use of foils and dielectrics. For example, a long thin capacitor has less waste material in margins than the short fat capacitor for the same capacitance value. Also, the longer capacitor will require fewer turns and would consequently have a higher winding rate. The value range may be further reduced by spraying more than one pass to deposit a thicker coating. If this is carried to extreme, however, this can increase drying and curing time and will again have an economical limit. Also, the masking tape width 100 can be varied to make the resistor short and wide. One difficulty with this problem in practical approach, however, is that the mechanical winding variation in the tape, as established by the tape width variation, produces a greater resistance variation percentage wise than would occur with the same absolute length variation applied to a longer resistor. Also, it is a known fact, that shorter resistors have more electrical noise and a higher voltage coefficient than does the longer resistor. This is because these characteristics are a function of the potential gradient, or simply volt per unit length. The capacitor values with which the resistor may marry in the constructions discussed will spread from a few micromicrofarads to one microfarad or higher using the general construction approaches aforediscussed.

Although specific embodiments of the invention have been shown and described, it is with full awareness that many modifications thereof are possible. The invention, therefore, is not to be restricted except insofar as is necessitated by the prior art and by the spirit of the appended claims.

What is claimed as the invention is:

1. The method of making a capacitor-resistor construction comprising the steps of convolutely winding electrode foils and plastic dielectric films to provide a coiled capacitor body with exposed electrode foil edge portions at each end of said body portion and with the outermost convolution of said body being of dielectric material, applying leads to each end of said body to contact and traverse a plurality of the electrode foil edge portions to form an electrical connection therewith, thereafter applying a carbon resin material having resistive characteristics directly to the outer surface of said outer convolution of dielectric material with sufficient portions of said resistive material contacting the exposed electrode foil edge portions of said capacitor body to thermally and electrically connect the resistive material to the electrode foil edge portions with portions of said resistive material being thermally and electrically connected with said leads, thereby to form at least one capacitor connection and at least one resistor connection to said leads accomplishing dissipation of heat throughout the capacitor-resistor body to assure relatively uniform functioning thereof.

2. The method set forth in claim 1 wherein the additional step of curing the carbon resistive material by placing the component in a temperature environment elevated above ambient occurs subsequent to dipping.

3. The method set forth in claim 2 wherein the capacitor-resistor component after curing of the resistive material is subsequently dipped into a protective coating bath to thereby apply an encapsulating coat surrounding the entire unit except for the ends of the lead means.

4. The method set forth in claim 1 wherein the carbon resistive material is applied by spraying at least a portion of the dielectric outer overwrap with a uniform layer of resistive material.

5. The method of making a capacitor-resistor construction comprising the steps of convolutely winding electrode foils and plastic dielectric films to provide a coiled capacitor body with exposed electrode foil edge portions at each end of said body portion and with the outermost convolution of said body being of dielectric material, applying a carbon resin material having resistive characteristics directly to the outer surface of said outer convolutions of dielectric material with sufficient portions of said resistive material contacting the exposed electrode foil edge portions of said capacitor body to thermally and electrically connect the resistive material to the electrode foil edge portions, applying leads to each end of said capacitor body to penetrate the carbon resin material for contacting and traversing a plurality of the electrode foil edge portions to form an electrode connection therewith and with the resistive material being thermally and electrically connected with said leads, thereby to form at least one capacitor connection and at least one resistor connection to said leads accomplishing dissipation of heat throughout the capacitor-resistor body to assure relatively uniform functioning thereof.

6. The method of making a capacitor-resistor construction comprising the steps of:
 (a) winding electrode foils and dielectric means into a convoluted form to provide a capacitor coil with the outermost wrap thereof being of dielectric material;
 (b) loading the capacitor coil on a tape with the axis of the coil disposed transversely to the long dimension of the tape;
 (c) spirally winding the tape carrying the capacitor coil onto a cylindrical drum with the tape being disposed adjacent to the drum and the capacitor coil having an exposed portion radially outwardly of the drum;
 (d) spraying a uniform layer of resistive material on the exposed portion of the capacitor coil disposed on said drum;
 (e) applying lead means to said capacitor coil to provide electrical connections to the electrode foils and to portions of said resistive material.

7. The method set forth in claim 6 wherein the sprayed resistive material is applied to approximately 180° of the circumferential periphery of the capacitor coil and the lead means are applied to the ends of the capacitor coil substantially transversely to the axis thereof in direct electrical contact with the resistive material and the electrode foils.

8. The method of making a capacitor-resistor construction comprising the steps of:
 (a) convolutely winding at least a pair of electrode foils and plastic dielectric means into a convoluted form to provide a substantially cylindrical capacitor coil with the outermost wraps of the coil being of dielectric material, and the ends of different electrode foils being exposed on the circumference of the coil adjacent different ends of the coil;
 (b) loading the capacitor coil by adhering the coil on a first tape having adhesive on one side only, the coil being disposed with the axis thereof transverse to the long dimension of the tape;
 (c) winding the thus loaded first tape on a cylindrical drum with the non-adhesive side thereof adjacent to the cylindrical drum;
 (d) winding a second tape as a mask over the capacitor coil, said tape having a predetermined width dimension less than the length of the coil only so as to expose preselected portions of the coil;
 (e) spraying a low resistivity carbon-containing resinous material on to the exposed portions of the coil;
 (f) removing said second tape;
 (g) spraying relatively high resistivity carbon-containing resinous material onto the capacitor coil;
 (h) removing the capacitor coil from the drum;
 (i) applying lead means to the coil to contact different ones of the electrode foils in a manner to simultaneously contact said low resistivity material; whereby an integral capacitor-resistor component is formed with the resistivity of the resistor portion of the component being determined by the width of said second tape and by the thickness of the relatively high resistivity material disposed on the coil.

References Cited by the Examiner

UNITED STATES PATENTS

| | | | |
|---|---|---|---|
| 2,464,377 | 3/1949 | Cohen | 333—79 |
| 2,684,317 | 7/1954 | Burnham | 29—25.42 X |
| 2,963,771 | 12/1960 | Clemons | 317—260 |
| 2,983,855 | 5/1961 | Schlicke | 317—242 |
| 3,002,136 | 9/1961 | Garstang | 317—242 |
| 3,040,415 | 6/1962 | Rayburn | 317—260 |

FOREIGN PATENTS 872,818  7/1961  Great Britain.

JOHN F. CAMPBELL, *Primary Examiner.*

WHITMORE A. WILTZ, JOHN P. WILDMAN,
*Examiners.*

W. F. ZAGURSKI, W. I. BROOKS, *Assistant Examiners.*